United States Patent
Vassilieva

(10) Patent No.: US 8,401,389 B2
(45) Date of Patent: Mar. 19, 2013

(54) METHOD AND SYSTEM FOR COMPENSATING FOR OPTICAL DISPERSION IN AN OPTICAL SIGNAL

(75) Inventor: Olga I Vassilieva, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 271 days.

(21) Appl. No.: 12/723,156

(22) Filed: Mar. 12, 2010

(65) Prior Publication Data

US 2011/0222864 A1   Sep. 15, 2011

(51) Int. Cl.
*H04J 14/02* (2006.01)
*H04B 10/12* (2006.01)
*H04B 10/00* (2006.01)

(52) U.S. Cl. ............................ 398/81; 398/147; 398/159

(58) Field of Classification Search .................. 398/29, 398/33, 81, 147, 149, 159
See application file for complete search history.

(56) References Cited

U.S. PATENT DOCUMENTS

| | | | | |
|---|---|---|---|---|
| 6,674,938 | B2 * | 1/2004 | Kosaka et al. | 385/24 |
| 6,771,854 | B2 * | 8/2004 | Matsuoka et al. | 385/24 |
| 7,609,969 | B2 | 10/2009 | Vassilieva et al. | 398/81 |
| 7,787,772 | B2 * | 8/2010 | Ota | 398/79 |
| 2004/0184814 | A1 * | 9/2004 | Ooi et al. | 398/147 |
| 2007/0189775 | A1 * | 8/2007 | Charlet et al. | 398/147 |
| 2009/0074417 | A1 | 3/2009 | Vassilieva et al. | 398/81 |
| 2009/0208224 | A1 * | 8/2009 | Kikuchi | 398/141 |

OTHER PUBLICATIONS

Serena et al.; "Nonlinear Penalty Reduction Induced by PMD in 112 Gbit/s WDM PDM-QPSK Coherent Systems"; Univeritá degli Studi di Parma, Dept. Ingegneria dell'Informazione, v.le G. Usberti 181/A, 43100 Parma (Italy); pp. 2, 2009.

Xie et al.; "Nonlinear Polarization Scattering Impairments and Mitigation in 10-Gbaud Polarization-Division-Multiplexed WDM Systems"; OSA/OFC/NFOEC 2009; pp. 3, 2009.

Renaudier et al.; "Impact of Temoral Interleaving of Polarization Tributaries Onto 100-Gb/s Coherent Transmission Systems With RZ Pulse Carving"; IEEE Photonics Technology Letters, vol. 20, No. 24; pp. 2036-2038, Dec. 15, 2008.

Serena et al.; "Nonlinear Penalty Reduction Induced by PMD in 112 Gbit/s WDM PDM-QPSK Coherent Systems"; Univeritá degli Studi di Parma, Dept. Ingegneria dell'Informazione, v.le G. Usberti 181/A, 43100 Parma (Italy); pp. 2, Dec. 2009.

Xie et al.; "Nonlinear Polarization Scattering Impairments and Mitigation in 10-Gbaud Polarization-Division-Multiplexed WDM Systems"; OSA/OFC/NFOEC 2009; pp. 3, Dec. 2009.

Chongjin Xie; "WDM coherent PDM-QPSK systems with and without inline optical dispersion compensation"; Optics Express, vol. 17, No. 6; pp. 4815-4823, Mar. 16, 2009.

Croussore et al.; Patent Application, U.S. Appl. No. 12/751,548; "Method and System for Reducing Cross-Phase Modulation in an Optical Signal"; pp. 22, Mar. 31, 2010.

* cited by examiner

*Primary Examiner* — Dalzid Singh
(74) *Attorney, Agent, or Firm* — Baker Botts L.L.P.

(57) ABSTRACT

A method for compensating for optical dispersion includes receiving an optical signal at a first node of an optical network that includes a first set of channels and a second set of channels that are each configured to be received using coherent digital receivers at a second node of the optical network. Each coherent digital receiver provides electronic dispersion compensation for the received channel at the second node. The method also includes forwarding the first set of channels from the first node without performing optical dispersion compensation on those channels. Furthermore, the method includes compensating for optical dispersion in the second set of channels at the first optical node and forwarding those channels from the first node. The optical dispersion compensation on the second set of channels at the first node provides dispersion compensation in addition to the compensation provided by the associated coherent digital receivers at the second node.

20 Claims, 4 Drawing Sheets

METHOD AND SYSTEM FOR COMPENSATING FOR OPTICAL DISPERSION IN AN OPTICAL SIGNAL

TECHNICAL FIELD OF THE INVENTION

The present invention relates generally to optical networks and, more particularly, to a method and system for compensating for optical dispersion in an optical signal.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of communicating the signals over long distances with very low loss. Optical networks often employ wavelength division multiplexing (WDM) or dense wavelength division multiplexing (DWDM) to increase transmission capacity. In WDM and DWDM networks, a number of optical channels are carried in each fiber at disparate wavelengths, thereby increasing network capacity.

An optical signal comprised of disparate wavelengths experiences optical dispersion, a sometimes undesirable phenomenon that causes the separation of an optical wave into spectral components with different frequencies. Optical dispersion occurs because the differing wavelengths propagate at differing speeds. The separation of an optical wave into its respective channels due to optical dispersion requires optical dispersion compensation for the particular optical signal.

Due to the ever-increasing volume and bit rate of data traffic, future transmission equipment will need to be capable of efficiently accommodating high-speed traffic, such as hundred-gigabit-per-second (100 Gb/s) traffic, and also will need to accommodate slower traffic on the same fiber such as 10 Gb/s signals. To receive high-speed signals (which may also include 40 Gb/s signals), a digital coherent receivers having digital signal processors are used. In 10 Gb/s and 40 Gb/s WDM transmission systems using conventional direct receivers (as opposed to coherent receivers), various optical dispersion compensation technologies are used to manage different types of waveform distortion generated in the optical signal. However, the amount and accuracy of compensation achievable with such conventional optical dispersion compensators is inadequate for 100 Gb/s signals. For such signals, a digital coherent receiver provides compensation of waveform distortion beyond the limits of optical dispersion compensation. However, issues still exists with the compensation of signals in such high-speed networks.

SUMMARY

In accordance with a particular embodiment of the present invention, a method for compensating for optical dispersion in an optical signal includes receiving an optical signal that includes a plurality of channels at a first node of an optical network. The plurality of channels include a first set of channels and a second set of channels that are each configured to be received using coherent digital receivers at a second node of the optical network. Each coherent digital receiver provides electronic dispersion compensation for the received channel at the second node. The method also includes forwarding the first set of channels from the first node without performing dispersion compensation on the first set of channels at the first node. Furthermore, the method includes compensating for optical dispersion in the second set of channels at the first optical node and forwarding the second set of channels from the first node. The optical dispersion compensation on the second set of channels at the first node provides dispersion compensation in addition to the compensation provided by the associated coherent digital receivers at the second node.

Technical advantages of one or more embodiments of the present invention may include performing optical dispersion compensation on optical signals comprised of a plurality of channels carrying high-speed data, such as 40 Gb/s and/or 100 Gb/s signals. Such signals may be received using coherent optical receivers; however, such receivers may not provide adequate dispersion compensation at long-haul distances. Particular embodiments of the present invention provide for adequate dispersion of such long-haul high-speed signals.

Technical advantages of one or more embodiments of the present invention may also include performing optical dispersion compensation on optical signals comprised of a plurality of channels carrying data modulated using different modulation techniques and/or different bit rates. For example, one or more embodiments of the present invention may perform optical dispersion compensation for a WDM signal comprised of 10 Gb/s non-return-to-zero (NRZ) channels received using direct optical receivers and 40 Gb/s and/or 100 Gb/s, differential-phase-shift-keying (DPSK) or differential-quadrature-phase-shift-keying (DQPSK) channels received using coherent optical receivers. Adequate dispersion compensation of all sets of channels will be performed despite the varying signal and receiver types.

Technical advantages of one or more embodiments of the present invention may also allow for an economically efficient system and method for performing optical dispersion compensation on optical signals comprised of channels with different modulation formats. One or more of the embodiments of the present invention may include system components currently in use in optical networks or allow for economically efficient upgrades of or additions to currently used components.

It will be understood that the various embodiments of the present invention may include some, all, or none of the enumerated technical advantages. In addition, other technical advantages of the present invention may be readily apparent to one skilled in the art from the figures, description and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
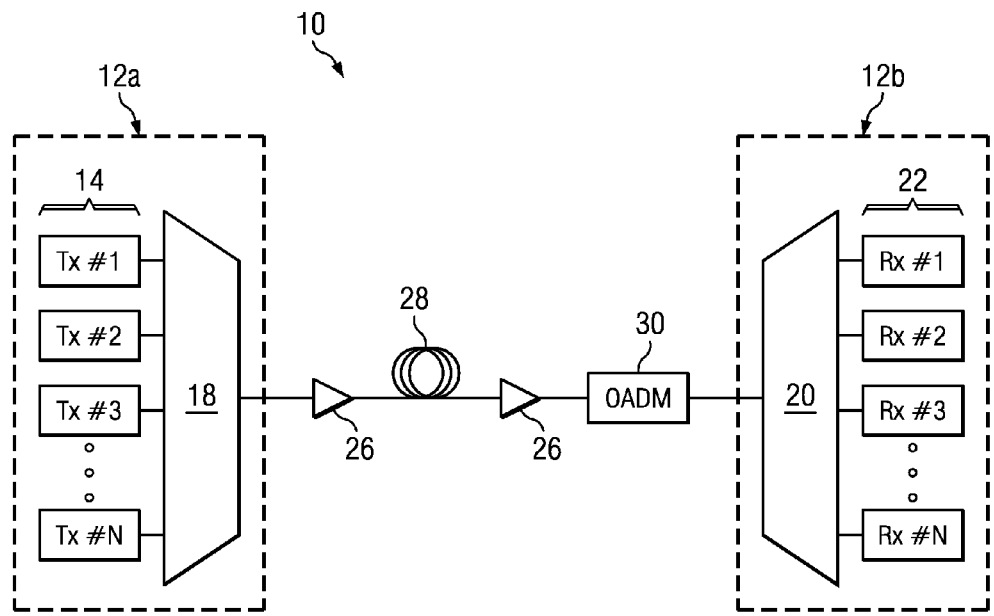
FIG. 1 is a block diagram illustrating one embodiment of a high-speed optical network.

FIG. 1 illustrates an example optical network 10. The optical network 10 includes one or more optical fibers 28 operable to transport one or more optical signals communicated by components of the optical network 10. The components of optical network 10, coupled together by the optical fibers 28, include terminal nodes 12a and 12b and one or more optical add/drop multiplexers (OADM) 30. Although the optical network 10 is shown as a point-to-point optical network with terminal nodes, the optical network 10 may also be configured as a ring optical network, a mesh optical network, or any other suitable optical network or combination of optical networks. The optical network 10 may be used in a short-haul metropolitan network, a long-haul inter-city network, or any other suitable network or combination of networks.

Terminal node 12a includes transmitters 14 and a multiplexer 18 (and may include other components, such as an amplifier). Transmitters 14 include any transmitter or other suitable device operable to transmit optical signals. Each transmitter 14 is operable to receive electrical information and to modulate one or more wavelengths of light to encode the information on the wavelength. In optical networking, a wavelength of light is also referred to as a channel. Each transmitter 14 is also operable to transmit this optically encoded information on the associated wavelength. The multiplexer 18 includes any multiplexer or combination of multiplexers or other devices operable to combine different channels into one signal. Multiplexer 18 is operable to receive and combine the disparate channels transmitted by transmitters 14 into an optical signal for communication along fibers 28.

Amplifiers 26 may be used to amplify the multi-channeled signal. Amplifiers 26 may be positioned before and/or after certain lengths of fiber 28. Amplifiers 26 may comprise an optical repeater that amplifies the optical signal. This amplification may be performed without opto-electrical or electro-optical conversion. In particular embodiments, an amplifier 26 may comprise an optical fiber doped with a rare-earth element. When a signal passes through the fiber, external energy is applied to excite the atoms of the doped portion of the optical fiber, which increases the intensity of the optical signal. As an example, amplifiers 26 may comprise erbium-doped fiber amplifiers (EDFA). However, any other suitable type of amplifier may be used, such as Raman amplifiers.

The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in networks would be limited to the bit rate of solely one wavelength. With more bandwidth, optical networks are capable of transmitting greater amounts of information. The terminal node 12a in optical network 10 is operable to transmit and multiplex disparate channels using WDM, DWDM, or some other suitable multi-channel multiplexing technique, and to amplify the multi-channel signal.

As discussed above, the amount of information that can be transmitted over an optical network varies directly with the number of optical channels coded with information and multiplexed into one signal. Therefore, an optical signal employing WDM may carry more information than an optical signal carrying information over solely one channel. An optical signal employing DWDM may carry even more information. Besides the number of channels carried, another factor that affects how much information can be transmitted over an optical network is the bit rate of transmission. The greater the bit rate, the more information may be transmitted.

Improvements and upgrades in optical network capacity generally involve either increasing the number of wavelengths multiplexed into one optical signal or increasing bit rates of information traveling on each wavelength. In either case, it is usually more cost-efficient to use, modify, or add to existing network components than to replace the entire optical system. For reasons relating to the cost of upgrading an optical system, upgrades sometimes occur in stages in which the network must support both new technologies that provide greater bandwidth and old technologies that provide less bandwidth.

Today, many existing networks transmit information at ten gigabits per second (GB/s) and modulate the information using, for example, a non-return-to-zero (NRZ) modulation technique. Signal transmission upgrades include, for example, transmitting information at forty GB/s using differential phase shift keying (DPSK) or differential quadrature phase shift keying (DQPSK) to modulate the optical signal. Since upgrading the entire optical network's transmitters would be cost-prohibitive for most optical network operators, many such operators have instead desired to upgrade their networks by incrementally replacing existing ten GB/s NRZ transmitters with forty and/or one hundred GB/s DPSK or DQPSK transmitters (these types of transmitters being used only as examples). Furthermore, operators also upgrade the receivers corresponding to this upgraded transmitter to provide coherent receivers able to receive these high-speed signals.

One challenge faced by those wishing to implement the cost-efficient strategy of integrating upgraded transmitters with existing transmitters is the challenge of optical dispersion compensation. Even in existing WDM and DWDM networks, optical signals comprised of disparate wavelengths experience optical dispersion. Optical dispersion refers to the separation of an optical signal into its spectral components with different frequencies. Optical dispersion occurs because the differing wavelengths propagate at differing speeds. As optical signals travel across existing optical networks and experience optical dispersion, they may receive optical dispersion compensation to achieve sufficient performance. Specially designed dispersion compensation fibers have been developed to compensate for dispersion in an optical signal comprised of channels modulated using the same modulation technique.

Systems that employ both upgraded transmitters and existing transmitters need to perform optical dispersion compensation on channels that use different modulation techniques. While coherent receivers used with one hundred GB/s signals (and some 40 GB/s signals) are able to perform compensation dispersion for those signals, other sources of dispersion compensation must be provided for those signals (such as 10 GB/s signals) that are received using direct receivers. Furthermore, because coherent receivers cannot provide adequate dispersion compensation for long-haul signals traveling over a certain distance, other sources of dispersion compensation must be provided for such long-haul signals received using coherent receivers.

Figure 2:
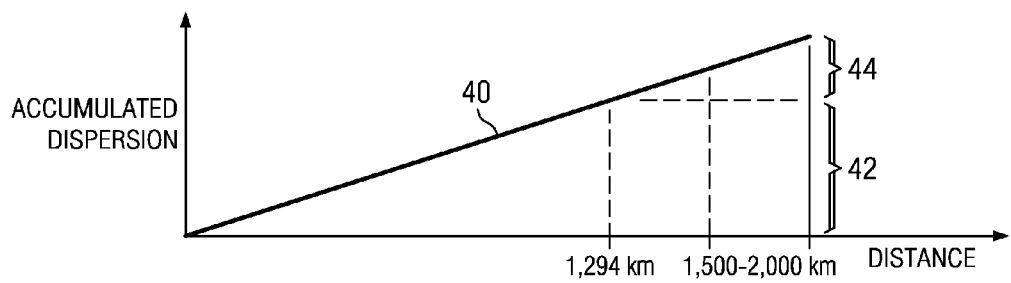
FIG. 2 is chart that illustrates an example amount of accumulated dispersion in a one hundred GB/s signal that travels a distance over an optical fiber.

For example, FIG. 2 is a chart that illustrates the amount of accumulated dispersion 40 in a one hundred GB/s signal that travels a distance over an optical fiber. Many applications call for an optical signal to be able to travel for up to 2,000 kilometers, but coherent receivers are not able to compensate for all the accumulated dispersion at such distances. For example, existing coherent receivers may only be able to compensate in a range of +/−22,000 picoseconds/nanometer. As illustrated in this example, the DSP of the coherent receiver is able to compensate for up to a first amount 42 of accumulated dispersion. Such a first amount 42 may be reached, for example, once the signal has traveled 1,294 kilometers over a single mode fiber. However, after such a distance the additional second amount 44 of accumulated dispersion cannot be compensated by the DSP of the coherent receiver. Thus, other components need to be used for dispersion compensation in such long-haul signals.

Referring back to the example embodiment in FIG. 1, the WDM signal generated by node 12a may include sets of channels using different modulation formats. In some embodiments, as will be described in further detail below, the WDM signal may comprises one or more channels communicating information at ten GB/s using NRZ modulation and one or more channels communicating information at one or both of forty and one hundred GB/s using DPSK or DQPSK modulation. In other embodiments, as will also be described below, the WDM signals may comprise only high-speed channels communicating information at forty and/or one hundred GB/s using DPSK or DQPSK modulation. However, some of these signals may be long-haul signals that need additional compensation other than what is provided by the coherent receivers that receive such signals.

Although these particular examples are given, the sets of channels that comprise the WDM signal may communicate information at any suitable bit rate and/or using any suitable modulation technique. For example, one or more of the channels may communicate information at a rate of ten, twenty, forty, eighty, over eighty GB/s, or any other suitable bit rate. One or more of the channels may additionally communicate information using a modulation technique such as return-to-zero (RZ), carrier suppressed return-to-zero (CS-RZ), NRZ, DPSK, DQPSK, or any other suitable modulation technique. As used herein, a "set" of channels may include one or more channels and does not imply any spatial or any other unspecified relationship among the channels (for example, the channels in a set need not be contiguous). In addition, as used herein, "information" may include any information communicated, stored, or sorted in the network. This information may have at least one characteristic modulated to encode audio, video, textual, real-time, non-real-time and/or other suitable data. Additionally, information communicated in optical network 10 may be structured in any appropriate manner including, but not limited to, being structured as frames, packets, or an unstructured bit stream.

After the multi-channel signal is transmitted from terminal node 12a, the signal travels over optical fiber(s) 28 to OADM (s) 30 (and may be amplified before and after such an OADM). The optical fibers 28 may include, as appropriate, a single, unidirectional fiber; a single, bi-directional fiber; or a plurality of uni- or bi-directional fibers. Although this description focuses, for the sake of simplicity, on an embodiment of the optical network 10 that supports unidirectional traffic, the present invention further contemplates a bi-directional system that includes appropriately modified embodiments of the components described below to support the transmission of information in opposite directions along the optical network 10.

OADMs 30 may include an amplifier, as well as an add/drop module (ADM). An ADM may include any device or combination of devices operable to add and/or drop optical signals from fiber 28. An ADM may also include any device or combination of devices operable to provide optical dispersion compensation in one or more sets of channels in an optical signal, as described more fully below. However, OADMs 30 do not include any in-line dispersion compensating components, such as an in-line dispersion compensating module (DCM).

DCMs include any dispersion compensating fiber (DCF) or other dispersion compensating device operable to perform optical dispersion compensation on a signal. In conventional networks carrying a single type of signal (such as a 10 GB/s NRZ signal), DCMs are provided in-line on the fiber so that channels of the signal are compensated by the DCM. Such DCMs adequately compensate the signal as it travels along the fiber. However, in networks that include coherent receivers, the coherent receivers perform the dispersion compensation on the received signal and thus in-line DCMs are undesirable and can interfere with proper dispersion compensation. However, this becomes problematic when a network has mixed signal types, where some of the signals need dispersion compensation before they reach the receiver. Such "mixed signal types" may include lower-speed signals that are received using direct receivers mixed with high-speed signals received using coherent receivers or they may include all high-speed signals received using coherent receivers but where some of the high-speed signals are adequately compensated by the coherent receiver and where others of the high-speed signals require additional compensation (other than that provided by the coherent receiver) due to the distance they travel.

Due to the need to provide additional compensation for particular channels, the OADM may include one or more DCMs that are not in-line and which can be used to provide dispersion compensation to particular ones of the channels. This "off-line" dispersion compensation of particular channels is described in further detail below.

After a signal passes through the one or more OADMs 30, the signal travels along fiber 28 to terminal node 12b. Terminal node 12b is operable to receive signals transmitted over optical network 10. Terminal node 12b includes a demultiplexer 20 and receivers 22 (and may also include an amplifier) . Demultiplexer 20 includes any demultiplexer or other device operable to separate the disparate channels multiplexed using WDM, DWDM, or other suitable multi-channel multiplexing technique. Demultiplexer 20 is operable to receive an optical signal carrying a plurality of multiplexed channels, demultiplex the disparate channels in the optical signal, and pass the disparate channels to different receivers 22.

Receivers 22 include any receiver or other suitable device operable to receive an optical signal. Each receiver 22 is operable to receive a channel of an optical signal carrying encoded information and demodulate the information into an electrical signal. These channels received by receivers 22 may include the channels transmitted by transmitters 14 and/or channels added by OADMs 30. In particular embodiments, some receivers 22 may be direct receivers and some may be coherent receivers. In other embodiments, all receivers 22 are coherent receivers.

In operation, transmitters 14 of terminal node 12a may transmit information at one or more bit rates and using one or more modulation techniques over different channels. The multiplexer 18 combines these different channels into an optical signal and communicates the signal over optical fiber 28. Amplifiers 26 receive the optical signal, amplify the signal, and pass the signal along optical fiber 28. Optical fiber 28 transports the signal to one or more OADMs 30, which may drop channels from the optical signal and/or add channels to the optical signal. In addition, the OADM may apply optical dispersion compensation on particular channels which are not compensated at the receiver or which are not adequately compensated at the receiver. Such "off-line" compensation of particular channels is described in further detail with respect the OADMs illustrated in FIGS. 3 through 5.

After the signal passes through the one or more OADMs 30, the terminal node 12b receives the forwarded signal. The demultiplexer 20 of terminal node 12b receives the signal, demultiplexes the signal into the signal's constituent channels, and passes the signal's constituent channels. Each channel is received by an associated receiver 22 of terminal node 12b. Some of those receivers 22 are coherent receivers are provided compensation to the received signals, which other receivers are direct receivers and do not provide compensation. For such direct receivers, an additional dispersion compensation module (which may be a tunable module) may be provided in associated with the receiver to provide additional compensation.

It should be noted that although particular components have been shown, modifications, additions, or omissions may be made to the optical network 10 without departing from the scope of the invention. The components of the optical network 10 may be integrated or separated according to particular needs. Moreover, the operations of the optical network 10 may be performed by more, fewer, or other components. Furthermore, as noted above, although the optical network 10 is shown as a point-to-point optical network with terminal nodes, the optical network 10 may also be configured as a ring optical network, a mesh optical network, or any other suitable optical network or combination of optical networks.

Figure 3:
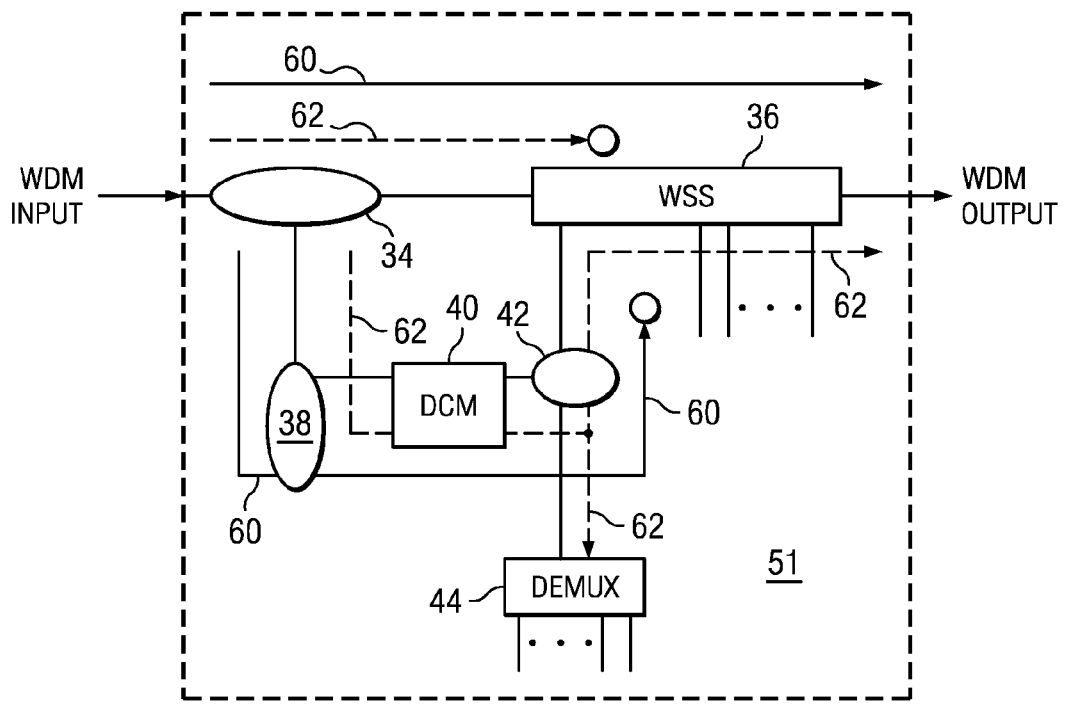
FIG. 3 is a block diagram illustrating an optical add/drop multiplexer of the network of FIG. 1 that compensates for optical dispersion according to a particular embodiment of the present invention.

FIG. 3 is a block diagram illustrating an OADM 51 (which is one example of an OADM 30 of the network of FIG. 1) that compensates for optical dispersion according to a particular embodiment of the present invention. Because the amplifier 26 is described above in the description of the example embodiment of FIG. 1, this devices will not be described again. As noted above, the amplifier 26 does not have an associated in-line DCM, as with some traditional OADMs.

OADM 51 is operable to receive an optical signal on the optical network 10, and, as described below, perform optical dispersion compensation for certain channels of the received signal. In particular, OADM 51 is useful to compensate signals in a long-haul, high-speed (such a one hundred GB/s) network where certain of the high-speed channels travel a distance such that a coherent receiver can compensate for the accumulated dispersion (for example, channels that travel less than around 1,294 kilometers) and where other of the channels travel more than this distance and require some additional compensation. Specifically, in the example embodiment of FIG. 3, OADM 51 is operable to pass through a first set of one or more channels 60 that do not need compensation and to perform optical dispersion compensation on a second set of one or more channels 62 that do need such compensation (because of the distance they have traveled). OADM 51 may include couplers 34, 38 and 42, a wavelength selective switch (WSS) 36, a DCM 40, and a demultiplexer 44 to perform this function.

Couplers 34, 38 and 42 may comprise an optical fiber coupler or other optical component operable to split an optical signal. Couplers 34, 38 and 42 are operable to split an optical signal into two copies of the optical signal.

The WSS 36 may comprise any WSS or other device operable to receive multiple optical signals, demultiplex each signal into the signal's constituent channels, terminate zero, one or more channels received, multiplex the remaining channels and any added channels, and pass the multiplexed signal along the optical network 10.

The DCM 40 may comprise any device operable to compensate for optical dispersion in each of a plurality of sets of channels using different modulation techniques.

The demultiplexer 44 may comprise any device operable to receive an optical signal and demultiplex the channels in the optical signal. For example, the demultiplexer 44 may be an arrayed waveguide grating (AWG) or another WSS. However, any other suitable demultiplexer 44 may be used.

In operation, the amplifier 26 receives an optical signal communicated on optical network 10, amplifies the optical signal, and forwards the optical signal to the OADM 51. As described above, the optical signal includes a number of high-speed channels 60 and 62 that are received using coherent receivers (for example, one hundred GB/s channels). Once amplified, the signal is sent via fiber 28 to the first coupler 34 of OADM 51.

In OADM 51, the first coupler 34 receives the optical signal from amplifier 26, splits the optical signal into two copies (with each copy including channels 60 and 62), passes the first copy to WSS 36, and drops the second copy to coupler 38. The WSS 36 receives the first copy, passes channels 60 that do not need compensation at the OADM 51, and terminates the channels 62 that are to be compensated in the OADM 51, as described in more detail below.

The second coupler 38 receives the second copy and passes the second copy to DCM 40. It should be noted that because a copy of the signal is not needed to be made where coupler 38 is located, such a coupler is not required. However, coupler 38 may be already present in the node architecture and/or may be provided to allow reconfiguration of the node as needed (for example, reconfiguration of the node to a configuration as shown in any of the following figures). DCM 40 compensates the second copy of the signal. DCM 40 is configured to compensate channels 62 the additional amount needed on account of the long distance that such channels 62 travel over the network 10. DCM 40 may be a tunable dispersion compensator such that it may be tuned to account for the specific amount of additional dispersion needed based on the particular distance that channels 62 travel. Although channels 60 also make up part of the second copy of the signal and are compensated by DCM 40, such compensation is not needed (because the coherent receivers that receive these channels can perform complete dispersion compensation) and these channels 60 of the second copy are terminated, as discussed below. After performing dispersion compensation, DCM 40 passes the second copy of the signal to the third coupler 42.

Coupler 42 splits the compensated signal from the DCM 40 into two copies, drops the first copy to demultiplexer 44, and passes the second copy to WSS 36. The demultiplexer 44 receives the first copy and separates the channels of the copy (which again include both channels 60 and 62). One or more of the channels may then be dropped to an associated coherent receiver for communication to one or more client devices of OADM 51 (or to other suitable destinations), or may be terminated. Because the channels 62 are now adequately compensated, they can be suitably processed by a coherent receiver.

The WSS 36 receives the second copy of the signal from coupler 42, terminates channels 60 (since they have received unneeded compensation), and combines the compensated channels 62 with the uncompensated channels 60 received from coupler 34. However, the WSS 36 may terminate particular channels 62 if the OADM 51 is a destination node for such a channel and/or if traffic is being added at OADM 51 in that channel. The WSS 36 then forwards the new optical signal comprising the uncompensated channels 60 and the compensated channels 62 (and any added channels) on the network.

One example application of OADM 51 is in a long-haul, high-speed network where most of the signals are transmitted over less than 1,294 kilometers and a few are transmitted over such a distance. In such a case, only selected OADMs nodes in the long-haul network would have DCMs as illustrated in FIG. 3. For example, such nodes could be implemented near the end of the network where some signals have traveled more than 1,294 kilometers. It should be noted that OADMs such as OADM 51 can have an associated Raman pump that can overcome the insertion loss associated with the DCM and its associated components. In a particular embodiment, the DCM can be divided into multiple sub-modules (each which performs a portion of the needed compensation) and some of them can be individually Raman pumped to ease the insertion loss. Alternatively or in addition, EDFA could also be inserted before or after the DCM and/or between DCM sub-modules.

Although OADM 51 of FIG. 3 is useful near the end of long-haul networks to receive channels 62 that have traveled farther than the distance for which dispersion can be compensated by a coherent receiver, a different OADM architecture is needed to receive channels 62 in other locations of the network where channels 62 have yet to travel a long distance and thus do no need additional dispersion compensation. Such an architecture is described in the following figure.

Figure 4:
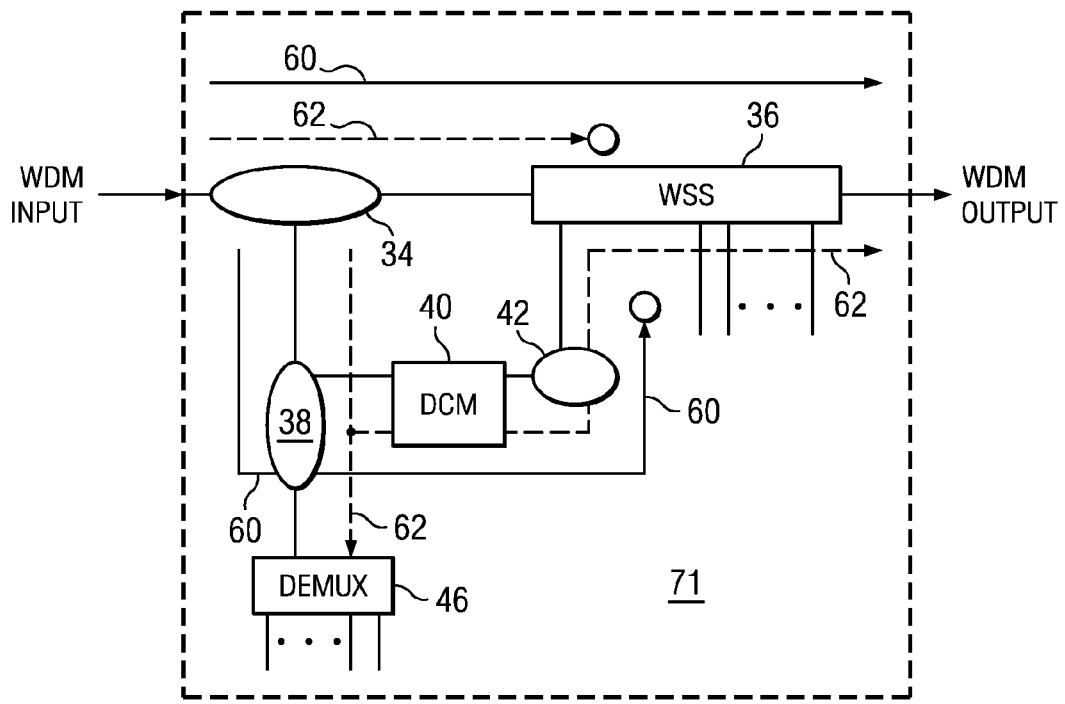
FIG. 4 is a block diagram illustrating another optical add/drop multiplexer of the network of FIG. 1 that compensates for optical dispersion according to another embodiment of the present invention.

FIG. 4 is a block diagram illustrating an OADM 71 (which is one example of an OADM 30 of the network of FIG. 1) that compensates for optical dispersion according to a particular embodiment of the present invention. Like OADM 51 of FIG. 3, OADM 71 is operable to receive an optical signal on the optical network 10, and perform optical dispersion compensation for certain channels of the received signal. Like OADM 51, OADM 71 is useful to compensate signals in a long-haul, high-speed (such a one hundred GB/s) network where certain of the high-speed channels travel a distance such that a coherent receiver can compensate for the optical dispersion (for example, channels that travel less than around 1,294 kilometers) and where other of the channels travel more than this distance and require some additional compensation. Specifically, in the example embodiment of FIG. 4, OADM 71 is operable to pass through a first set of one or more channels 60 that do not need compensation and to perform optical dispersion compensation on a second set of one or more channels 62 that do need such compensation (because of the distance they have traveled).

As with OADM 51, OADM 71 may include couplers 34, 38 and 42, a WSS 36, a DCM 40, and a demultiplexer 46 to perform this function. These components are the same (other than demultiplexer 46) as the like-numbered components of FIG. 3 and will not be discussed in further detail. Demultiplexer 46 may be the same type of component as demultiplexer 44 of FIG. 3, with the difference being that it is coupled to coupler 38 instead of coupler 42.

In operation, the amplifier 26 receives an optical signal communicated on optical network 10, amplifies the optical signal, and forwards the optical signal to the OADM 71. As described above, the optical signal includes a number of high-speed channels 60 and 62 that are received using coherent receivers (for example, one hundred GB/s channels). Once amplified, the signal is sent via fiber 28 to the first coupler 34 of OADM 71.

In OADM 71, the first coupler 34 receives the optical signal from amplifier 26, splits the optical signal into two copies (with each copy including channels 60 and 62), passes the first copy to WSS 36, and drops the second copy to coupler 38. The WSS 36 receives the first copy, passes channels 60 that do not need compensation at the OADM 71, and terminates the channels 62 that are to be compensated in the OADM 71, as described in more detail below.

The second coupler 38 receives the second copy and makes two copies of the second copy (which will be referred to as a third copy and a fourth copy). Coupler 38 forwards the third copy to demultiplexer 46 and forwards the fourth copy to DCM 40. The demultiplexer 46 receives the third copy and separates the channels of the copy (which again include both channels 60 and 62). One or more of the channels may then be dropped to an associated coherent receiver for communication to one or more client devices of OADM 71 (or to other suitable destinations), or may be terminated. Because the channels 62, at this point in their travel over network 10, do not need compensation in addition to that provided the associated coherent receiver(s), they are dropped to the receiver(s) before being compensated by DCM 40 and can be suitably processed by a coherent receiver.

DCM 40 compensates the fourth copy of the signal. DCM 40 is configured to compensate channels 62 the additional amount needed on account of the long distance that such channels 62 will eventually travel over the network 10. Although such additional compensation is not needed at the location of the network 10 where OADM 71 is located, such compensation is needed for receipt of the signals after further travel in the network 10. Furthermore, although channels 60 also make up part of the fourth copy of the signal and are compensated by DCM 40, such compensation is not needed (because the coherent receivers that receive these channels can perform complete dispersion compensation) and these channels 60 of the fourth copy are terminated, as discussed below.

After performing dispersion compensation, DCM 40 passes the fourth copy of the signal to the third coupler 42. Coupler 42 then passes the signal to WSS 36. It should be noted that because a copy of the signal is not needed to be made where coupler 42 is located, such a coupler is not required. However, coupler 42 may be already present in the node architecture and/or may be provided to allow reconfiguration of the node as needed (for example, reconfiguration of the node to a configuration as shown in FIG. 3).

The WSS 36 receives the second copy of the signal from coupler 42, terminates channels 60 (since they have received unneeded compensation), and combines the compensated channels 62 with the uncompensated channels 60 received from coupler 34. However, the WSS 36 may terminate particular channels 62 if the OADM 71 is a destination node for such a channel and/or if traffic is being added at OADM 71 in that channel. The WSS 36 then forwards the new optical signal comprising the uncompensated channels 60 and the compensated channels 62 (and any added channels) on the network.

The OADM architectures of FIGS. 3 and 4 are useful in a linear network where the particular location of the network after which particular channels (such as channels 62 need compensation) is fixed. However, in a ring network or a network of interconnected rings, such a location is relative to the location of the node that originally transmitted a channel and such a location may be different for different channels at different location. Thus, at any given node in a ring network, the node may need to pass some channels without providing additional dispersion compensation, may need to drop some channels without first providing additional dispersion compensation before the signals are received at the corresponding receiver, and may need to drop some channels that need additional dispersion compensation before the signals are received at the corresponding receiver.

Figure 5:
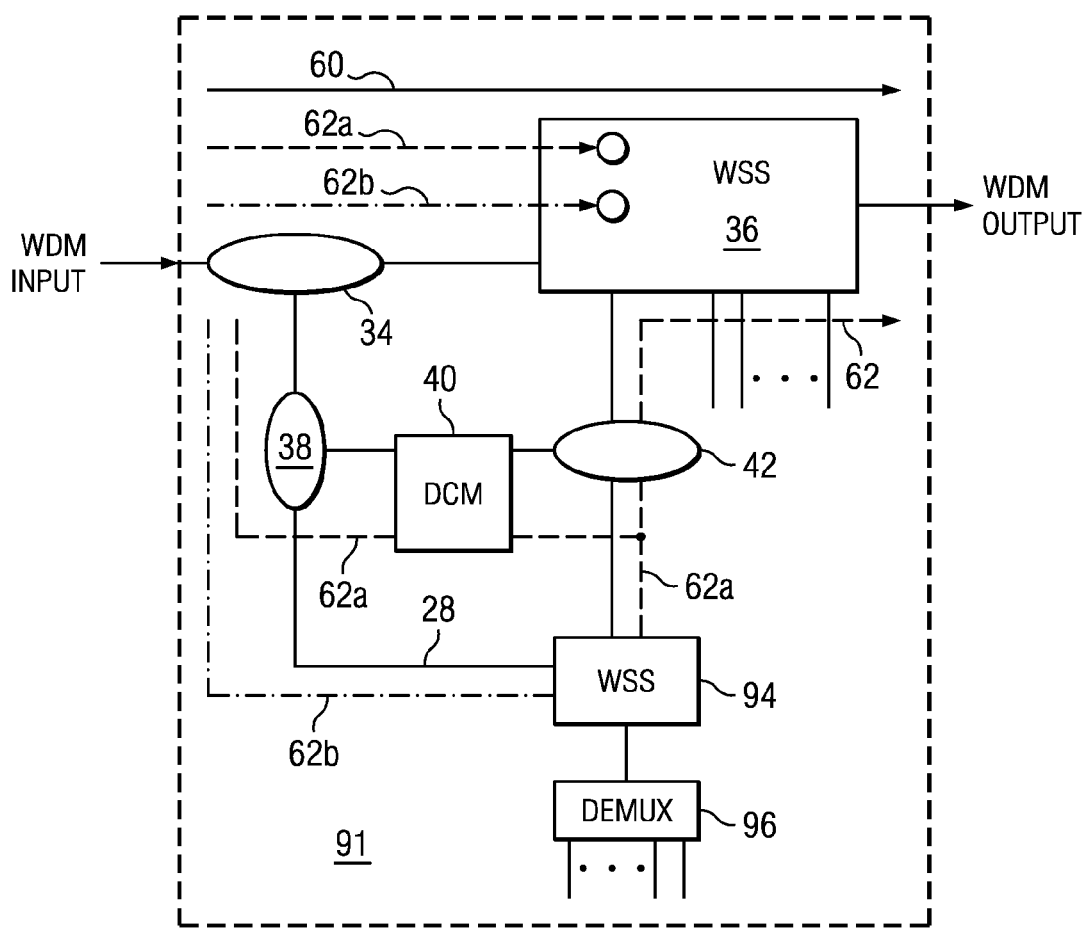
FIG. 5 is a block diagram illustrating yet another optical add/drop multiplexer of the network of FIG. 1 that compensates for optical dispersion according to another embodiment of the present invention.

FIG. 5 is a block diagram illustrating an OADM 91 (which is one example of an OADM 30 of the network of FIG. 1) that compensates for optical dispersion according to a particular embodiment of the present invention. Like OADMs 51 and 71 of FIGS. 3 and 4, OADM 91 is operable to receive an optical signal on the optical network 10, and perform optical dispersion compensation for certain channels of the received signal. Specifically, in the example embodiment of FIG. 5, OADM 91 is operable to pass through a first set of one or more channels 60 that do not need compensation and to perform optical dispersion compensation on a second set of one or more channels 62 that do need such compensation (because of the distance they have traveled or will travel). However, unlike the previously illustrated OADMs, OADM 91 is configured to be able to both drop certain ones of channels 62 that do not need additional compensation to be adequately received (channels 62*b*) and to drop other of channels 62 that do need additional compensation to be adequately received (channels 62*a*).

As with OADMs 51 and 71, OADM 91 may include couplers 34, 38 and 42, a WSS 36, and a DCM 40. These components are the same as the like-numbered components of FIGS. 3 and 4 and will not be discussed in further detail. However, instead of having a demultiplexer coupled to coupler 38 (as in FIG. 4) or to coupler 42 (as in FIG. 3), OADM 91 has a WSS 94 coupled to both coupler 38 and coupler 42 and a demultiplexer 96 coupled to this demultiplexer 94. As explained below, this configuration allows channels 62 to be dropped before or after dispersion compensation is applied by DCM 40.

In operation, the amplifier 26 receives an optical signal communicated on optical network 10, amplifies the optical signal, and forwards the optical signal to the OADM 91. As described above, the optical signal includes a number of high-speed channels 60 and 62 that are received using coherent receivers (for example, one hundred GB/s channels). Once amplified, the signal is sent to the first coupler 34 of OADM 91.

In OADM 91, the first coupler 34 receives the optical signal from amplifier 26, splits the optical signal into two copies (with each copy including channels 60 and 62), passes the first copy to WSS 36, and drops the second copy to coupler 38. The WSS 36 receives the first copy, passes channels 60 that do not need compensation at the OADM 91, and terminates the channels 62 (both channels 62*a* and 62*b*) that are to be compensated in the OADM 91, as described in more detail below.

The second coupler 38 receives the second copy and makes two copies of the second copy (which will be referred to as a third copy and a fourth copy). Coupler 38 forwards the third copy to WSS 94 and forwards the fourth copy to DCM 40. DCM 40 compensates the fourth copy of the signal. DCM 40 is configured to compensate channels 62*a* the additional amount needed on account of the long distance that such channels 62*a* have traveled or will eventually travel over the network 10. Furthermore, although channels 60 also make up part of the fourth copy of the signal and are compensated by DCM 40, such compensation is not needed (because the coherent receivers that receive these channels can perform complete dispersion compensation) and these channels 60 of the fourth copy are terminated, as discussed below. After performing dispersion compensation, DCM 40 passes the fourth copy of the signal to the third coupler 42. Coupler 42 then creates two copies of the compensated signal and forwards one copy to WSS 36 and the other copy to WSS 94.

WSS 94 receives the uncompensated copy of the input signal from coupler 38 and a copy of the compensated signal from coupler 42. Although the figure illustrates only channels 62*b* coming from coupler 38 and only channels 62*a* coming from coupler 42, all channels of the signal are sent (the illustrated channels 62*a* and 62*b* are simply the channels that may be eventually dropped to a receiver and/or forwarded through WSS 36). WSS 94 filters out particular ones of the channels to be forwarded to demultiplexer. For example, WSS 94 may be configured to block all the channels 62*a* received from coupler 38, pass one or more of the channels 62*b* received from coupler 38, block all the channels 62*b* received from coupler 42, and pass one or more of the channels 62*a* received from coupler 42. In this way, duplicate signals in the same wavelength are not forwarded to demultiplexer 96 and only signals that are properly compensated (they have either received or not received additional compensation from DCM 40 as needed) are forwarded to demultiplexer 96. Demultiplexer 96 separates the channels of the signal received from WSS 94 and one or more of these channels may then be dropped to an associated coherent receiver for communication to one or more client devices of OADM 91 (or to other suitable destinations), or may be terminated.

WSS 36 receives a copy of the compensated input signal from coupler 42, terminates channels 60 (since they have received unneeded compensation), and combines the compensated channels 62 with the uncompensated channels 60 received from coupler 34. However, the WSS 36 may terminate particular channels 62 if the OADM 91 is a destination node for such a channel and/or if traffic is being added at OADM 91 in that channel. The WSS 36 then forwards the new optical signal comprising the uncompensated channels 60 and the compensated channels 62 (and any added channels) on the network.

Although the OADM 91 of FIG. 5 is versatile and can properly compensate high-speed traffic as needed in many types of networks, it does not account for networks that mix lower-speed signals (such as ten or forty GB/s signals) received with direct receivers with high-speed signals received with coherent receivers. Because such lower-speed signals need a different type of compensation than the high-speed signals, another type of dispersion compensation needs to be provided by the node.

Figure 6:
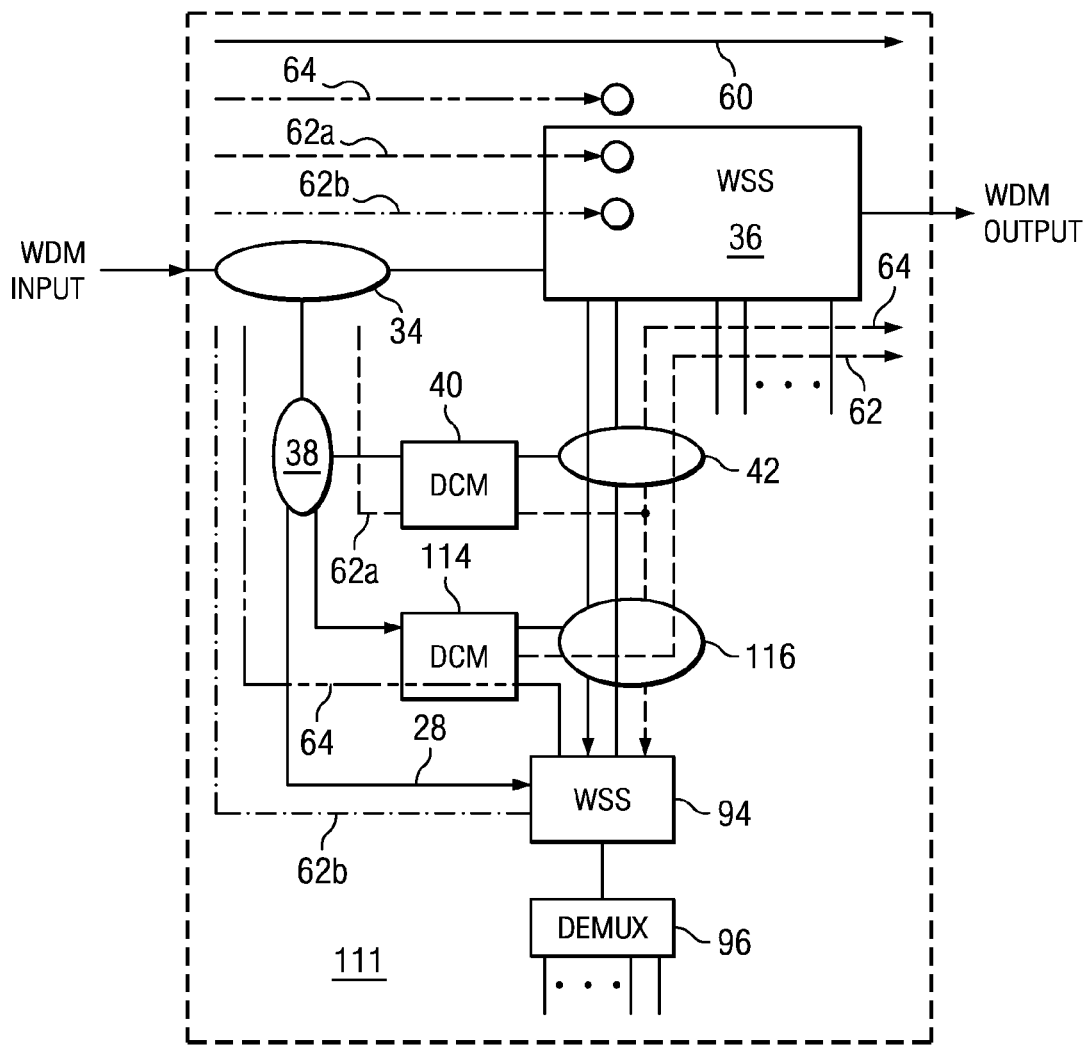
FIG. 6 is a block diagram illustrating a further optical add/drop multiplexer of the network of FIG. 1 that compensates for optical dispersion according to another embodiment of the present invention.

FIG. 6 is a block diagram illustrating an OADM 111 (which is one example of an OADM 30 of the network of FIG. 1) that compensates for optical dispersion according to a particular embodiment of the present invention. Like OADMs 51, 71 and 91 of FIGS. 3, 4 and 5, OADM 111 is operable to receive an optical signal on the optical network 10, and perform optical dispersion compensation for certain channels of the received signal. Specifically, like OADM 91, OADM 111 is operable to pass through a first set of one or more channels 60 that do not need compensation and to perform optical dispersion compensation on a second set of one or more channels 62 that do need such compensation (because of the distance they have traveled or will travel). Also like OADM 91, OADM 111 is configured to be able to both drop certain ones of channels 62 that do need additional compensation to be adequately received (channels 62*a*) and to drop other of channels 62 that do not yet need additional compensation to be adequately received (channels 62*b*). In addition, OADM 111 is also configured to provide compensation to lower-speed channels 64 that need a different amount of dispersion compensation than channels 62a.

As with the previously-described OADMs, OADM 111 may include couplers 34, 38 and 42, WSSs 36 and 94, a DCM 40, and demultiplexer 96. These components are the same as the like-numbered components of FIG. 5 and will not be discussed in further detail. However, in addition to DCM 40 used to compensate channels 62a, OADM 111 also has a DCM 114 used to compensate lower-speed channels 64 (and associated coupler 116).

In operation, the amplifier 26 receives an optical signal communicated on optical network 10, amplifies the optical signal, and forwards the optical signal to the OADM 111. As described above, the optical signal includes a number of high-speed channels 60 and 62 that are received using coherent receivers and lower speed channels 64 that are received using direct receivers.

In OADM 111, the first coupler 34 receives the optical signal from amplifier 26, splits the optical signal into two copies (with each copy including channels 60, 62 and 64), passes the first copy to WSS 36, and drops the second copy to coupler 38. The WSS 36 receives the first copy, passes channels 60 that do not need compensation at the OADM 111, and terminates the channels 62 (both channels 62a and 62b) and channels 64 that are to be compensated in the OADM 111, as described in more detail below.

The second coupler 38 receives the second copy and makes three copies of the second copy (which will be referred to as third, fourth and fifth copies). Coupler 38 forwards the third copy to WSS 94, forwards the fourth copy to DCM 40, and forwards the fifth copy to DCM 114.

DCM 40 compensates the fourth copy of the signal. DCM 40 is configured to compensate channels 62a the additional amount needed on account of the long distance that such channels 62a have traveled or will eventually travel over the network 10. Furthermore, although channels 60 and 64 also make up part of the fourth copy of the signal and are compensated by DCM 40, such compensation is not appropriate and these channels 60 and 64 of the fourth copy are terminated, as discussed below. After performing dispersion compensation, DCM 40 passes the compensated fourth copy of the signal to the third coupler 42. Coupler 42 then creates two copies of the compensated signal and forwards one copy to WSS 36 and the other copy to WSS 94.

DCM 114 compensates the fifth copy of the signal. DCM 114 is configured to compensate channels 64 as would be done by convention in-line dispersion compensation devices used in conventional lower-speed networks. For example, the DCM 114 in each OADM 111 may compensate for 95% of the dispersion accumulated in the fiber between the node and the previous node. Any suitable compensation may be applied based on the signal type and fiber type. Furthermore, although channels 60 and 62 also make up part of the fifth copy of the signal and are compensated by DCM 114, such compensation is not appropriate and these channels 60 and 62 of the fifth copy are terminated, as discussed below. After performing dispersion compensation, DCM 114 passes the compensated fifth copy of the signal to the fourth coupler 116. Coupler 116 then creates two copies of the compensated signal and forwards one copy to WSS 36 and the other copy to WSS 94.

WSS 94 receives the uncompensated copy of the input signal from coupler 38 and a copy of the compensated signals from couplers 42 and 116. Although the figure illustrates only channels 62b coming from coupler 38, only channels 62a coming from coupler 42, and only channels 64 coming from coupler 116, all channels of the signal are sent (the illustrated channels are simply the channels of each signal that may be eventually dropped to a receiver and/or forwarded through WSS 36). WSS 94 filters out particular ones of the channels to be forwarded to demultiplexer. For example, WSS 94 may be configured to block all the channels 62a and 64 received from coupler 38, pass one or more of the channels 62b received from coupler 38, block all the channels 62b and 64 received from coupler 42, pass one or more of the channels 62a received from coupler 42, block all the channels 62a and 62b received from coupler 116, and pass one or more of the channels 64 received from coupler 116. In this way, duplicate signals in the same wavelength are not forwarded to demultiplexer 96 and only signals that are properly compensated are forwarded to demultiplexer 96. Demultiplexer 96 separates the channels of the signal received from WSS 94 and one or more of these channels may then be dropped to an associated coherent receiver for communication to one or more client devices of OADM 111 (or to other suitable destinations), or may be terminated.

WSS 36 receives a copy of the compensated input signal from coupler 42, terminates channels 60 (since they have received unneeded compensation) and channels 64 (since they have received improper compensation), and combines the compensated channels 62 with the uncompensated channels 60 received from coupler 34. WSS 36 also receives a copy of the compensated input signal from coupler 116, terminates channels 60 (since they have received unneeded compensation) and channels 62 (since they have received improper compensation), and combines the compensated channels 64 with the uncompensated channels 60 received from coupler 34 and the compensated channels 62 received from coupler 42. The WSS 36 may terminate particular channels if the OADM 111 is a destination node for such a channel and/or if traffic is being added at OADM 111 in that channel. The WSS 36 then forwards the new optical signal comprising the uncompensated channels 60 and the compensated channels 62 and 64 (and any added channels) on the network.

Although the present invention has been described with several embodiments, various changes and modifications may be suggested to one skilled in the art. It is intended that the present invention encompass such changes and modifications as fall within the scope of the appended claims. For example, modifications, additions, or omissions may be made to the OADMs described without departing from the scope of the invention. The components of the OADMs described may be integrated or separated according to particular needs. Moreover, the operations of the OADMs may be performed by more, fewer, or other components.

What is claimed is:

1. A method for dispersion compensation of an optical signal, comprising:

receiving an optical signal comprising a plurality of channels at a first node of an optical network, wherein the plurality of channels comprise a first set of one or more channels and a second set of one or more channels that are each configured to be received using one or more coherent digital receivers at a second node of the optical network, each coherent digital receiver providing electronic dispersion compensation for the received channel at the second node;

forwarding the first set of channels from the first node to the second node without performing dispersion compensation on the first set of channels at the first node;

compensating for optical dispersion in the second set of channels at the first node and forwarding the second set of channels from the first node to the second node; and providing dispersion compensation for the second set of channels by the associated coherent digital receivers at the second node in addition to the optical compensation provided at the first node.

2. The method of claim 1, wherein:
the first set of channels are transmitted less than a pre-specified distance from the origin of the first set of channels to the second node; and
the second set of channels are transmitted further than the pre-specified distance from the origin of the second set of channels to the second node;
the coherent digital receivers at the second node are not able to fully compensate for optical dispersion of signals transmitted for a distance further than the pre-specified distance.

3. The method of claim 2, where the pre-specified distance is 1,294 kilometers.

4. The method of claim 1, wherein:
the information being communicated in the first set of channels is communicated at 100 GB/s; and
the information being communicated in the second set of channels is communicated at 100 GB/s.

5. The method of claim 1, wherein forwarding the first set of channels from the first node without performing dispersion compensation on the first set of channels and compensating for optical dispersion in the second set of channels at the first optical node and forwarding the second set of channels from the first node comprises:
splitting the received optical signal into at least a first copy of the optical signal and a second copy of the optical signal;
terminating the second set of channels in the first copy at a switch of the first node;
performing dispersion compensation on the second copy;
terminating the first set of channels in the second copy at the switch; and
combining the first set of channels in the first copy with the second set of channels in the second copy for which dispersion compensation has been performed.

6. The method of claim 5, further comprising:
after performing dispersion compensation on the second copy, splitting the compensated second copy into a third copy and a fourth copy;
forwarding the third copy to the switch to terminate the first set of channels in the third copy at the switch and to combine the second set of channels in the third copy with the first set of channels in the first copy at the switch;
demultiplexing the channels of the fourth copy; and
receiving the information in one or more of the channels of the fourth copy at one or more coherent digital receivers associated with the first node.

7. The method of claim 5, further comprising:
before performing dispersion compensation on the second copy, splitting the second copy into a third copy and a fourth copy;
forwarding the third copy to a dispersion compensation device of the first node;
forwarding the compensated third copy from the dispersion compensation device to the switch to terminate the first set of channels in the second copy at the switch and to combine the second set of channels in the third copy with the first set of channels in the first copy at the switch;
demultiplexing the channels of the fourth copy; and
receiving the information in one or more of the channels of the fourth copy at one or more coherent digital receivers associated with the first node.

8. The method of claim 1, wherein forwarding the first set of channels from the first node without performing dispersion compensation on the first set of channels and compensating for optical dispersion in the second set of channels at the first optical node and forwarding the second set of channels from the first node comprises:
splitting the received optical signal into at least a first copy of the optical signal and a second copy of the optical signal;
terminating the second set of channels in the first copy at a first switch of the first node;
splitting the second copy into a third copy and a fourth copy;
forwarding the third copy to a second switch of the first node without performing dispersion compensation;
performing dispersion compensation on the fourth copy using a dispersion compensation device and forwarding the compensated fourth copy to the first switch and to the second switch;
forwarding zero or more channels of the third copy and zero or more channels of the fourth copy from the second switch to a demultiplexer, demultiplexing the forwarded channels using the demultiplexer, and receiving the information in the forwarded channels at one or more coherent digital receivers associated with the first node;
terminating the first set of channels in the fourth copy at the first switch; and
at the first switch, combining the first set of channels in the first copy with the second set of channels in the fourth copy for which dispersion compensation has been performed.

9. The method of claim 1, wherein:
the received optical signal comprises a third set of one or more channels that are each configured to be received using one or more direct receivers at the second node;
the method further comprises compensating for optical dispersion in the third set of channels at the first optical node and forwarding the third set of channels from the first node, where the optical dispersion compensation on the third set of channels is different than the optical dispersion compensation on the second set of channels.

10. The method of claim 9, wherein:
the information being communicated in the first set of channels is communicated at 40 GB/s or 100 GB/s;
the information being communicated in the second set of channels is communicated at 40 GB/s or 100 GB/s; and
the information being communicated in the third set of channels is communicated at 10 GB/s.

11. A first node of a network for dispersion compensation of an optical signal, the optical signal comprising a plurality of channels, wherein the plurality of channels comprise a first set of one or more channels and a second set of one or more channels that are each configured to be received using one or more coherent digital receivers at a second node of the optical network, each coherent digital receiver providing electronic dispersion compensation for the received channel at the second node, the first node comprising:
a switch configured to forward the first set of channels from the first node to the second node without performing dispersion compensation on the first set of channels at the first node and configured to forward the second set of channels from a dispersion compensating device, wherein the dispersion compensation device is configured to compensate for optical dispersion in the second set of channels at the first node; and
the coherent digital receivers at the second node providing dispersion compensation associated with the second set of channels forwarded by the switch in addition to the dispersion compensation provided at the first node.

12. The node of claim 11, wherein:
the first set of channels are transmitted less than a pre-specified distance from the origin of the first set of channels to the second node; and
the second set of channels are transmitted further than the pre-specified distance from the origin of the second set of channels to the second node;
the coherent digital receivers at the second node are not able to fully compensate for optical dispersion of signals transmitted for a distance further than the pre-specified distance.

13. The node of claim 12, where the pre-specified distance is 1,294 kilometers.

14. The node of claim 11, wherein:
the information being communicated in the first set of channels is communicated at 100 GB/s; and
the information being communicated in the second set of channels is communicated at 100 GB/s.

15. The node of claim 11, further comprising a first coupler configured to split the received optical signal into at least a first copy of the optical signal and a second copy of the optical signal; and wherein:
the switch is configured to terminate the second set of channels in the first copy;
the dispersion compensation device is configured to perform dispersion compensation on the second copy;
the switch is configured to terminate the first set of channels in the second copy; and
the switch is configured to combine the first set of channels in the first copy with the second set of channels in the second copy for which dispersion compensation has been performed.

16. The node of claim 15, further comprising:
a second coupler configured to receive the second copy from the dispersion compensation device and to split the compensated second copy into a third copy and a fourth copy;
a demultiplexer configured to receive and demultiplex the channels of the fourth copy and forward one or more of the channels of the fourth copy to one or more coherent digital receivers;
wherein the switch is configured to receive the third copy, terminate the first set of channels in the third copy, and combine the second set of channels in the third copy with the first set of channels in the first copy.

17. The node of claim 15, further comprising:
a second coupler configured to receive the second copy from the first coupler, split the second copy into a third copy and a fourth copy, and forward the third copy to the dispersion compensation device;
a demultiplexer configured to receive and demultiplex the channels of the fourth copy and forward one or more of the channels of the fourth copy to one or more coherent digital receivers;
wherein the switch is configured to receive the compensated third copy from the dispersion compensation device, terminate the first set of channels in the second copy, and combine the second set of channels in the third copy with the first set of channels in the first copy.

18. The node of claim 11:
further comprising a first coupler configured to split the received optical signal into at least a first copy of the optical signal and a second copy of the optical signal;
wherein the switch is configured to terminate the second set of channels in the first copy;
further comprising a second coupler configured to split the second copy into a third copy and a fourth copy, forward the third copy to a second switch of the first node without performing dispersion compensation, and forward the fourth copy to the dispersion compensation device;
wherein the dispersion compensation device is configured to perform dispersion compensation on the fourth copy and forward the compensated fourth copy to the first switch and to the second switch;
further comprising the second switch configured to forward zero or more channels of the third copy and zero or more channels of the fourth copy from the second switch to a demultiplexer;
further comprising the demultiplexer configured to demultiplex the received channels and forward the demultiplexed channels to one or more coherent digital receivers associated with the first node; and
wherein the switch is configured to terminate the first set of channels in the fourth copy and to combine the first set of channels in the first copy with the second set of channels in the fourth copy for which dispersion compensation has been performed.

19. The node of claim 11, wherein the received optical signal comprises a third set of one or more channels that are each configured to be received using one or more direct receivers at the second node, the first node further comprising a second dispersion compensation device configured to compensate for optical dispersion in the third set of channels, where the optical dispersion compensation on the third set of channels is different than the optical dispersion compensation on the second set of channels.

20. The node of claim 19, wherein:
the information being communicated in the first set of channels is communicated at 40 GB/s or 100 GB/s;
the information being communicated in the second set of channels is communicated at 40 GB/s or 100 GB/s; and
the information being communicated in the third set of channels is communicated at 10 GB/s.

* * * * *